US 8,359,471 B2

(12) United States Patent
Wiersma (10) Patent No.: US 8,359,471 B2
(45) Date of Patent: Jan. 22, 2013

(54) SYSTEM AND METHOD FOR GENERATING A SIGNATURE

(76) Inventor: Hieronymus Watse Wiersma, Amsterdam (NL)

( * ) Notice: Subject to any disclaimer, the term of this patent is extended or adjusted under 35 U.S.C. 154(b) by 929 days.

(21) Appl. No.: 12/377,394

(22) PCT Filed: Aug. 17, 2007

(86) PCT No.: PCT/NL2007/000202
§ 371 (c)(1),
(2), (4) Date: May 8, 2009

(87) PCT Pub. No.: WO2008/020754
PCT Pub. Date: Feb. 21, 2008

(65) Prior Publication Data
US 2010/0250953 A1    Sep. 30, 2010

(30) Foreign Application Priority Data
Aug. 17, 2006    (NL) ..................................... 1032340

(51) Int. Cl.
*H04L 29/06*    (2006.01)
(52) U.S. Cl. ........ 713/176; 713/177; 713/178; 713/179; 713/180; 713/181; 713/182; 713/183; 713/184; 713/185; 713/186
(58) Field of Classification Search .................. 713/180, 713/186
See application file for complete search history.

(56) References Cited

U.S. PATENT DOCUMENTS

| 6,202,151 | B1 * | 3/2001 | Musgrave et al. ............ 713/186 |
| 6,310,966 | B1 * | 10/2001 | Dulude et al. ................ 382/115 |
| 6,553,494 | B1 * | 4/2003 | Glass ........................... 713/186 |
| 6,694,045 | B2 * | 2/2004 | Shi et al. ....................... 382/119 |
| 6,745,327 | B1 | 6/2004 | Messing |
| 7,024,562 | B1 | 4/2006 | Flink et al. |
| 7,054,470 | B2 * | 5/2006 | Bolle et al. .................... 382/124 |
| 7,082,538 | B2 * | 7/2006 | Bouchard et al. ............ 713/181 |
| 7,272,245 | B1 * | 9/2007 | Layton ......................... 382/115 |
| 8,127,130 | B2 * | 2/2012 | Ellis .............................. 713/151 |

(Continued)

FOREIGN PATENT DOCUMENTS

| WO | WO-96/36934 A | 11/1996 |
| WO | WO-98/39876 A | 9/1998 |

(Continued)

OTHER PUBLICATIONS

Search Report of NL 1032340.

(Continued)

*Primary Examiner* — Jeffrey Pwu
*Assistant Examiner* — William Corum, Jr.
(74) *Attorney, Agent, or Firm* — Ryan A. Schneider, Esq.; Troutman Sanders LLP (57) ABSTRACT

The present invention provides a system and a method for generating digital signatures. The system comprises a first formula which generates the signature as selected series from at least two, but preferably more digitized biometric features of a user. The signature comprises a different selected series per unit of time of for instance 10 seconds. The invention comprises a second formula which assigns a numerical value to a data file. The second formula can also use the numerical value to define another time interval, on the basis of which another signature can be generated. The invention further provides a number of examples for application of the generated signature during the sending of data files.

25 Claims, 3 Drawing Sheets

U.S. PATENT DOCUMENTS

| | | | |
|---|---|---|---|
| 2003/0044050 A1* | 3/2003 | Clark et al. | 382/115 |
| 2003/0115475 A1* | 6/2003 | Russo et al. | 713/186 |
| 2003/0118212 A1* | 6/2003 | Min et al. | 382/100 |
| 2003/0149881 A1* | 8/2003 | Patel et al. | 713/186 |
| 2005/0132201 A1* | 6/2005 | Pitman et al. | 713/176 |
| 2005/0216531 A1* | 9/2005 | Blandford | 707/204 |
| 2006/0120577 A1* | 6/2006 | Shinzaki et al. | 382/124 |
| 2006/0286969 A1* | 12/2006 | Talmor et al. | 455/415 |
| 2007/0031009 A1* | 2/2007 | Mwale | 382/115 |
| 2007/0106895 A1* | 5/2007 | Huang et al. | 713/170 |
| 2010/0169651 A1* | 7/2010 | Scheidt | 713/176 |
| 2010/0268956 A1* | 10/2010 | Micali et al. | 713/176 |
| 2011/0126024 A1* | 5/2011 | Beatson et al. | 713/186 |

FOREIGN PATENT DOCUMENTS

| | | |
|---|---|---|
| WO | WO-01/08352 A | 2/2001 |
| WO | WO-2005/039103 A | 4/2005 |

OTHER PUBLICATIONS

International Search Report of PCT/NL2007/000202.

* cited by examiner

SYSTEM AND METHOD FOR GENERATING A SIGNATURE

BENEFIT CLAIMS

This application is a US National Stage of International Application No. PCT/NL2007/000202, filed 17 Aug. 2007, which claims the benefit of NL 1032340, filed 17 Aug. 2006.

FIELD OF THE INVENTION

The present invention relates to a system and a method for generating an (electronic) signature based on biometric features.

The signature is for instance suitable for certifying electronic documents or for digitally signing data files. The signature according to the present invention can be applied in existing systems for sending a file and a signature, wherein the file and the signature are for instance connected to each other with a hash function or encryption.

The subject-matter of the invention relates to a secure (digital) signature. A secure signature preferably has the following characteristics:

1) The signature can be traced with the most possible certainty back to the sender so as to identify the sender. The signature makes it in effect impossible to successfully dispute the signature in legal proceedings;
2) The signature cannot be reused. This prevents copying of the signature by a fraudulent person;
3) It is not possible to infer from the signature how a subsequent signature might appear; and
4) The signature is person-related.

BACKGROUND OF THE INVENTION

A known manner of generating a signature comprises of incorporating biometric features of the sender in the digital signature. Biometric features are person-related features based on physical characteristics. Examples of biometric features are finger or toe-prints, voice, speech, retina, iris, geometry or vein pattern of a hand, movement or behavioural characteristics, voice pattern and so on.

A method and a device for digitally signing an electronic document are known from U.S. Pat. No. 7,024,562-B1. A sample is taken from a set of biometric features of the sender. The sample is digitized and added as (part of a) signature to the electronic document to be sent. The combination of signature and document is then encrypted by a hash function. The encrypted combination is sent together with the original document and the original signature. The recipient retrieves the original document and the digital signature from the encrypted combination and compares them to the sent document and the sent signature. If they are the same, it is assumed that the received document is the correct document intended to be sent, without anything having been changed therein during sending.

WO-01/08352-A1 provides a method and an apparatus for providing a document with a signature on the basis of a biometric feature. The signature comprises a sample of a biometric feature taken and digitized at the moment of sending. The document is provided with a time stamp. The signature is then added to the document. Using a personal key the combination of signature, time stamp and document is encrypted.

A drawback of the above described methods is that the signature is always the same. The signature on the document can therefore be imitated after sending. This means that the signature can be copied and reused. A fraudulent person can use the copied signature to sign and send a new document, drawn up by him or her, in the name of the person to whom the signature belongs.

BRIEF SUMMARY OF THE INVENTION

The present invention has for its object to provide a more secure signature.

The present invention provides for this purpose a method for generating a signature for a data file to be sent to a recipient by a sender, comprising the steps of:
  providing a number of digitized biometric features;
  determining a first point in time;
  determining a first time interval within which the first point in time falls;
  generating a first signature, which comprises a number of positions, on the basis of the first time interval using a first formula, wherein each position is filled with one of the digitized biometric features in accordance with a selection differing per time interval from the number of digitized biometric features.

The problem of reuse or copying is solved by the link to a time interval. An electronic signature according to the present invention cannot be valid outside the time interval to which it is linked. A different signature is generated for each time interval. The number of possible signatures can be increased by storing a greater number of digitized biometric features, or subdivisions thereof, or by having the signature consist of a greater number of positions. As the technical possibilities progress, the number of possible signatures can thus also be increased so as to achieve a desired level of security. A number is understood to mean at least two.

The number of digitized features optionally comprises different parts of digitized biometric features. The number of stored biometric features can be increased by using parts of biometric features. Taking for instance the ten fingerprints as example, these can be split up into parts. The number of biometric features can thus be increased to for instance fifty or more features. The number of biometric features can further comprise whole biometric features and parts thereof. Owing to the different size thereof, additional options are created for generating a different signature. That is, different positions in the signature are filled with biometric features of a different size.

In an embodiment the first time interval is less than or equal to 30 seconds, preferably in the order of 10 seconds.

In another embodiment the number of digitized features comprises at least ten different biometric features. In yet another embodiment the number of digitized features comprises different parts of digitized biometric features. The number of positions herein comprises for instance at least five positions, and preferably 8, 10, 15, 20 or more positions. The number of possible signatures is for instance determined by the number of positions to the power of the number of (parts of) biometric features: Possible signatures=(number of positions)^(number of biometric features).

In a period of time of 67.5 years 210,000,000 different signatures can for instance be generated per time interval of 10 seconds.

For verification purposes the method comprises in an embodiment the steps of:
  the sender disputing a signature of a data file;
  the recipient sending the signature to the third party for the purpose of verification;
  the third party applying the first formula for the purpose of generating a check signature using the first formula on the basis of the time interval of sending of the data file and the number of digitized biometric features of the sender; and comparing the check signature with the signature of the sent data file.

Verification of a digital signature is thus possible at any later time, whereby disputing (by a sender) of a digital signature of a data file once it has been sent is in fact pointless.

According to another aspect, the present invention provides a system for generating a signature for a data file to be sent to a recipient by a sender, comprising:

a first device, comprising:

a first memory;

time-determining means for determining a first point in time and a first time interval within which the first point in time falls; and a processing unit coupled to the first memory and to the time-determining means;

a first formula stored in the first memory;

a number of digitized biometric features stored in the first memory;

wherein the first device is adapted to provide the data file to be sent with a first signature which is generated by the first formula on the basis of the first time interval, and wherein the signature comprises a number of positions, wherein each position is filled with one of the digitized biometric features in accordance with a selection differing per time interval from the number of digitized biometric features.

The selected digitized biometric features of the sender provide, for instance after being sent to the recipient, indisputable evidence in respect of the signature by, and the identity of, the sender.

In an embodiment the first device comprises security means for allowing the sender access to the first device after identification by means of one or more biometric features. Only the correct sender can thus gain access to the first device and/or make this first device function.

The system preferably also comprises a third memory which is held by a third party, such as a trusted third party (TTP) or a government agency, wherein the first formula is stored in the third memory. After the digital signature of the data file has been sent, it can be verified with the third party if the sender disputes this signature.

The digital signature is person-related and cannot be copied after sending since the signature is specific to a relatively short time interval within which the time of sending falls. The time interval is relatively short, for instance shorter than 30 seconds, or in the order of 10 seconds. At a later point in time, which falls within a later time interval, a different signature should therefore used. Fraud is thus prevented. An additional advantage is that the signature can be sent in non-encrypted form.

BRIEF DESCRIPTION OF THE DRAWINGS

Further advantages and features of the invention are shown in the accompanying drawings, in which.

DETAILED DESCRIPTION OF THE PREFERRED EMBODIMENTS

Example of System

Figure 1:
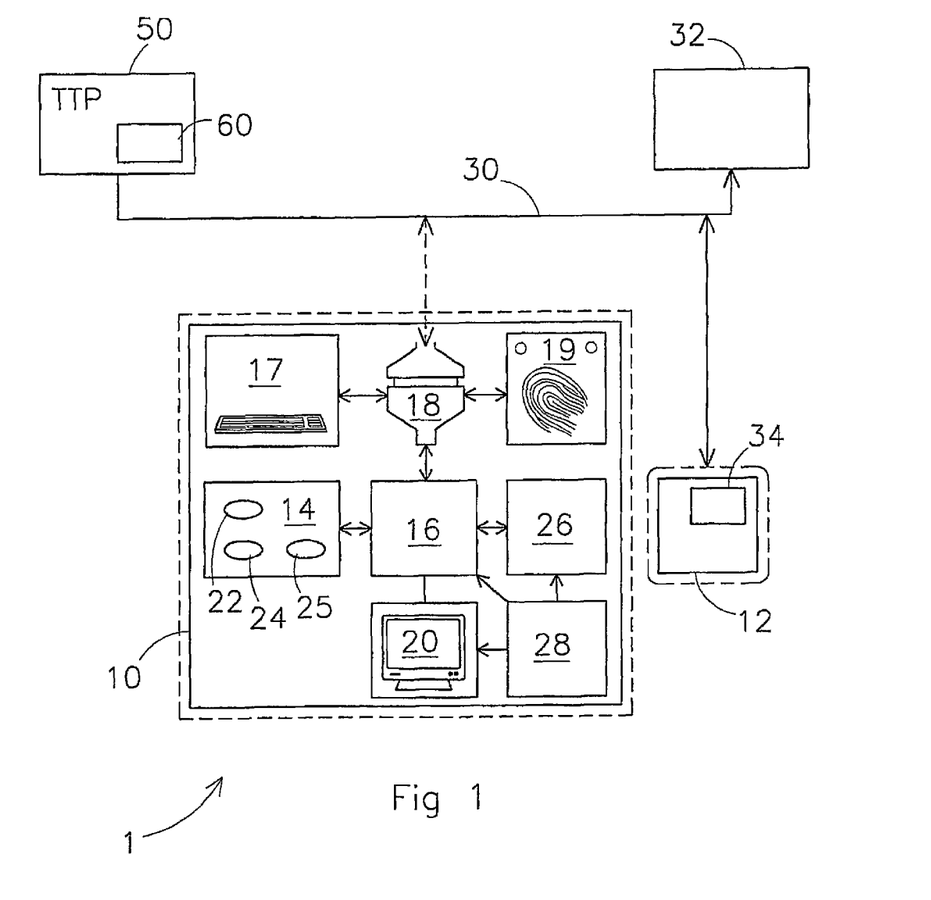
FIG. 1 shows a schematic overview of an embodiment of a system according to the present invention.

A system 1 for digital signing of data files according to the present invention comprises a first device 10 and a second device 12. First device 10 comprises a memory 14 in which are stored, among other things, a number of, i.e. at least two, predetermined digitized biometric features of the user for whom the device 10 is intended. A processing unit 16 is coupled to memory 14. In a practical embodiment memory 14 comprises a ROM, EEPROM or similar memory element. Processing unit 16 comprises for instance a microprocessor which is suitable for use in a mobile, portable apparatus.

Device 10 further comprises an interface coupled to processing unit 16. The interface is for instance intended to couple first device 10 to external equipment or an external network, for input and output of data and the like. The interface comprises for this purpose for instance a keyboard 17, a port or plug connection 18 and/or a scanner 19 for inputting biometric features of the user. Device 10 further comprises a display screen 20 for displaying data which is coupled to processing unit 16.

A first formula 22 and a second formula 24 are stored in memory 14. The operation of the formulae has been elucidated in the foregoing and is elucidated further hereinbelow. A statement of agreement 25 is optionally stored in memory 14.

Device 10 comprises a clock 26 which is coupled to processor 16. Clock 26 can preferably indicate both the time and the date. In order to have clock 26 indicate the time and/or date as precisely as possible, device 10 with clock 26 can be coupled to an external clock, for instance via network 30. The coupling to network 30 can be established via plug connection 18 of the interface. The interface can however also comprise a transmitter/receiver which can communicate wirelessly with for instance transmitter masts or a satellite and the like. Network 30 is for instance the internet, which in turn is connected to a precision clock such as an atomic clock.

In an embodiment the clock 26 of first device 10 comprises only time-determining means which couple to the external precision clock via network 30 and thus determine and transmit the date and the time to processor 16.

First device 10 is preferably mobile. This is understood to mean that device 10 is portable and can be carried around, or can also be fitted as a chip in other equipment with a display. In a mobile embodiment the first device 10 comprises a battery 28 which is coupled to the other elements of first device 10 for the purpose of providing them with electric power.

The first and the second device 10, 12 are preferably secured against improper use. This security is indicated in FIG. 1 by the broken line round the two devices. Improper use is understood to mean for instance an attempt to disassemble the device in question. The security of the first and/or the second device comprises for instance means which disable the device in the case of improper use. The security means of first device 10 are further adapted to allow the user access to the device and/or cause first device 10 to function only after the user has identified him/herself by means of inputting one or more biometric features via scanner 19.

Example of Method for Sending

A method for signing documents according to the present invention operates for instance as follows.

In step 100 (FIG. 2) the user supplies the desired biometric features beforehand to a third party, for instance a so-called trusted third party 50 (hereafter: TTP) or a government agency. The number of desired biometric features is sufficient for the desired application and security. The number comprises for instance one biometric feature with subdivisions thereof, or two, three, four, five, 15, 20, 30, 50 or more different (subdivisions of) biometric features.

Figure 2:
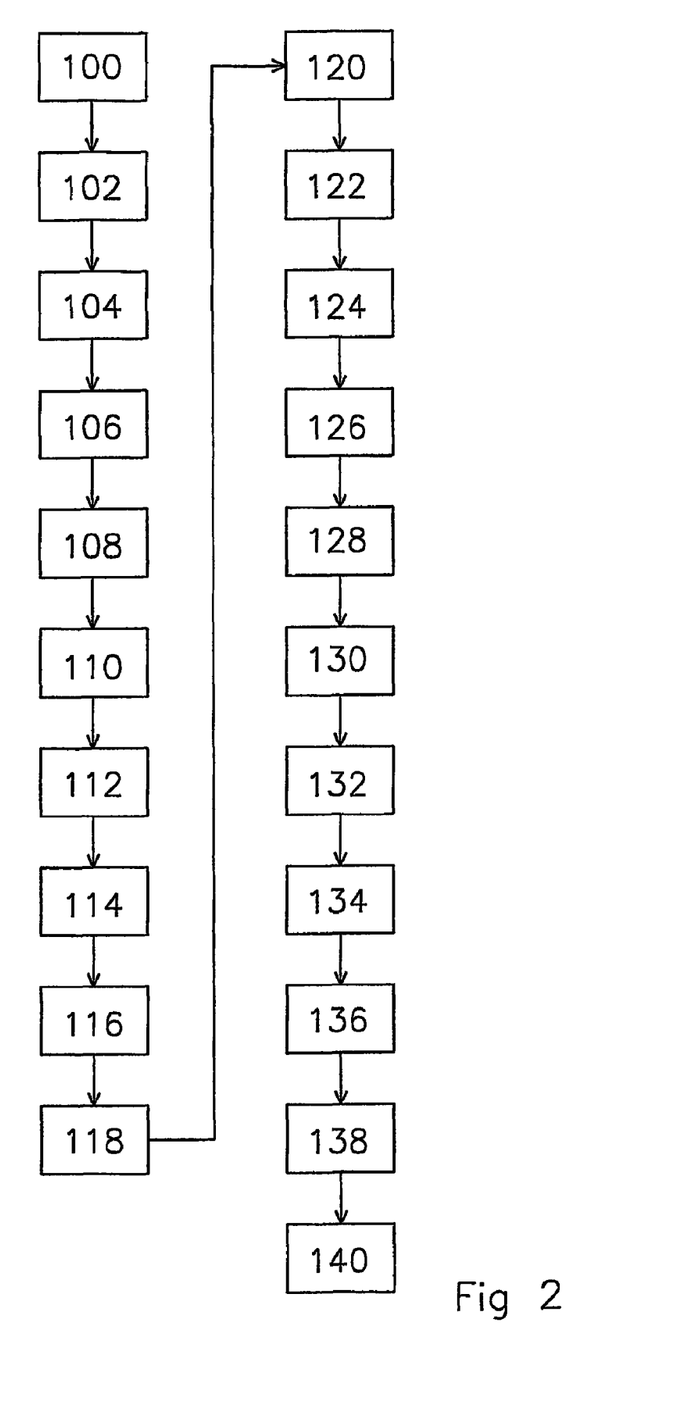
FIG. 2 shows a flow diagram of an embodiment of a method according to the present invention.

In step 102 the TTP 50 arranges the supplied biometric features in digital form in memory 14 of first device 10. TTP 50 also arranges the first and second formulae 22, 24 in memory 14. Access control to device 10 is further arranged, and makes use of recognition of one or more biometric features of the user as described above.

First formula 22 is also stored in secured manner with TTP 50, for instance in memory 60 which can form part of a computer and database. Memory 60 is secured here such that the status of TTP 50 as reliable, independent party is fully guaranteed. Neither the recipient nor the sender has access to the first formula.

In step 104 (FIG. 2) TTP 50 supplies the first and second devices 10 and 12 to the relevant user. Both devices are secured against improper use as described above.

In the case of improper use the first and/or the second device 10 or 12 will self-destruct in step 106.

If the user wishes to send a data file with signature, he/she inputs the data file for sending into first device 10 in step 108. Inputting takes place for instance by coupling an external computer via network 30 to port 18 of first device 10.

First formula 22 has the function of generating an electronic signature. The signature comprises a number of positions, for instance two to five positions. Each position is filled with a biometric feature which is chosen per time interval from the for instance sixteen to 50 biometric features of the user stored in memory 14. The signature takes on a different form per time interval, which is for instance in the order of 5 to 30 seconds, for instance 10 seconds. The signature is therefore random and differs subject to the time and the date of sending. The electronic signature will be used to sign a data file to be sent.

In step 110 the electronic signature is generated at the request of the user and added as signature to the data file to be sent.

The possible number of digital signatures which can be generated comprising random combinations of biometric features is in principle substantially unlimited, i.e. it can be made as great as is technically possible and/or desirable. The number of biometric features in a combination, the sequence of the features or choices of the biometric features from the number of stored features make an astronomical number of different combinations possible.

In one embodiment sixteen digitized biometric features are for instance stored in memory 14. The first formula 22 will for instance define another combination of biometric features as signature every 10 seconds. The combination comprises for instance a series of at least two digitized biometric features. In order to increase the number of possibilities even further, digitized biometric features can occur at more than one position in the series. In addition to the signature, the date and the time of sending are also added to the digital signature. The date and time are obtained from clock 26. In order to prevent confusion relating to a fraud due to different time zones, the time zone of sending can also be inserted, with a difference relative to GMT. In another embodiment the time of a single external precision clock is definitive. It is also possible to send a signed data file only at the end of the relevant time interval.

It is up to the user to update clock 26 as often as is found necessary in practice. As described above, this can be done by coupling first device 10 to an external precision clock via network 30, for instance every day or week.

The digitized biometric features of the sender/user thus have a dual function. On the one hand they provide a recipient 32 (FIG. 1) with indisputable evidence in respect of the signature by, and the identity of, the sender. On the other hand they function as parameters for first formula 22.

The TTP 50 could in principle suffice with a single formula 22 which is the same for every user. On the one hand however, it could be of enormous importance that first formula 22 remains secret, while on the other hand it should not be ruled out that targeted attempts at deciphering said first formula will be made using powerful computers. It is for instance possible to envisage a user sending very many signatures, say 250,000 to 1 million, to an accomplice. In order to prevent the pattern and the structure of first formula 22 from being discovered using high-grade computers, TTP 50 could have at its disposal a large number of different first formulas 22, for instance 50 or more. A first formula issued to a user is replaced after a predetermined period. The predetermined period is for instance in the order of 0.5 to 5 years or of 2 to 4 years.

In another embodiment elucidated hereinbelow this problem is obviated in that a randomized series of (parts of) biometric features which differs for each individual sender forms the material on which the first formula is used.

Example of Numerical Value

In an embodiment a second formula 24 is stored in memory 14 of first device 10. Second formula 24 provides the data file signed in the above described manner in step 110 (FIG. 2) with a recognition pattern. The recognition pattern comprises for instance a so-called byte value pattern or a numerical value as described hereinbelow.

It is noted here that a bit value or any other suitable reproducible and document-specific value occurring in a pattern can also be used instead of a byte value. This pattern is referred to as numerical value.

For the purpose of preparation and further refinement, the second formula moreover adds an opening and/or closing sentence to the signed data file in step 112. This opening and/or closing sentence is for instance also used to give messages. The messages for instance include:
- that an electronic signature according to the present invention has been used as signature;
- that determined steps have here been taken;
- that determined steps must still be taken; and/or
- that some initiative is expected here from the recipient (such as a response as described below), since in the absence of this initiative the validity of the sent electronic signature will expire.

The refining of step 112 can be important if the data file for sending is a document with a very short statement, such as: "Agree to EUR 10,000.00". Since the verification options using the numerical value can be reduced considerably in the case of such a brief statement, the signed document can be provided with said opening and/or closing sentence.

In step 114 second formula 24 generates the numerical value or the byte value pattern from the data file. The data file to be sent comprises by this time the signature and the opening and/or closing sentence.

Byte value pattern is understood to mean the marking of a byte with the symbol corresponding therewith at random positions throughout the whole data file to be sent.

In an embodiment the first byte is for instance an E, the seventh byte a p, the 16th byte a space, the 26th byte an e, the 41st byte a part of a line of a graphic representation, and so on. This creates a pattern of numerical values and symbols, the byte value pattern, i.e.: {Ep $e_{13}$}

The outcomes of the additions of all letters, numbers, symbols and spaces of the document to be sent are optionally added to this byte value pattern in step 116. That is, the total number of a's, b's, . . . , z's, the total number of the numbers 0, 1, . . . , 9, the number of spaces, the number of question marks and other symbols occurring in the document. This is also referred to as a cumulative addition of symbols.

In step 118 a recognition attachment, which comprises the whole of the byte value pattern and/or the cumulative addition of symbols, is added to the document of a data file which is to be sent and has been provided with a signature. The recognition attachment can be (temporarily) stored here in memory 14.

Each change in the signed data file to be sent will manifest itself as a change in the byte value pattern and/or in the cumulative addition of symbols, or numerical value. Addition or deletion of for instance a 0 in an amount or changing "not" into "net" while simultaneously deleting or adding an (immediately) preceding text part inevitably results in a different byte value pattern. It is thus possible to check afterward whether a change has occurred in the document after sending. Since such a change could have been made by a third party against the will of the recipient, the digitally signed data file will lose its validity with each change after first signature. For a data file signed in legally valid manner a new data file will then have to be signed, sent and returned.

In step 120 the signed data file is sent, including the recognition attachment. For this purpose the first device 10 is coupled to network 30 via port 18.

In step 122 the sent data file is received by recipient 32. Recipient 22 can view the data file on a device suitable for this purpose which is provided with a display screen, such as a computer. The content of the sent data file is shown, as well as a text which indicates that the document has been signed in the above described manner and optionally that a recognition attachment has been added. Although the recognition attachment and the signature are sent, they are not shown and are not recognizable.

After receiving and opening the sent data file in step 122, a message that user 32 must send back the received data file within a predetermined period of time in order to confirm that the document has been received in a determined form also appears on the display screen in step 124. The received data file is understood to mean the whole of the data file, the signature and the recognition attachment. The time period is for instance in the order of 15 minutes after opening of the data file.

In step 124 the first device, which is still coupled for this purpose to network 30 via port 18, checks whether the document is sent back within the set time period. If not, recipient 32 receives an error message which is also stored in memory 14. The signature of the sent document is deemed invalid.

If the sent data file is however returned within the set time period, first device 10 checks in step 126 whether:
- the returned data file is identical to the sent data file; this preferably in the case of a relatively small data file; and/or
- the byte value pattern of the returned data file is identical to the sent byte value pattern; and/or
- the cumulative addition of symbols of the returned data file is identical to the sent cumulative addition of symbols.

If one or more of the above checks produces a negative outcome, recipient 32 receives an error message. The digital signature of the sent data file is hereby deemed invalid.

If the above checking steps 124 and 126 both produce a positive outcome, a statement of agreement 25 is generated by first device 10 in step 128. In step 130 the statement of agreement is sent to recipient 32 and to second device 12 via network 30. As has already been discussed in part and will be discussed further, the statement of agreement is accompanied by a signature according to the present invention, for instance Y(S, ti_3). Second device 12 stores in a memory 34 the statement of agreement and the approved electronic signature, the associated recognition attachment and/or the signed data file. Said storage in memory 34 serves also for the purpose of archiving for the sender.

In practice the second device 12 is for instance a non-mobile computer connected to a network and provided with a memory 34 with sufficient storage capacity to store the statements of agreement, recognition appendices, signatures and signed data files.

In the above stated step 130 first device 10 sends a statement of agreement 25 to second device 12 and to recipient 32. The statement of agreement is also displayed on screen 20. The statement of agreement comprises for instance a client number of the sender with TTP 50 and/or a message that the recognition attachment has been stored for later checking. The signature of the sent data file according to the present invention is hereby completed.

In step 132 recipient 32 has the option of verifying whether the signature does indeed originate from the correct sender. The statement of agreement from first device 10 is forwarded for this purpose by the recipient to TTP 50 for verification of the client number of the sender.

In step 134 TTP 50 sends a reply in the form of a confirmation or a rejection to recipient 32. The reply from TTP 50 informs recipient 32 that the name of the sender is or is not linked to the stated client number. In the latter case, i.e. if the client number and the name of the sender do not correspond, the digital signature of the sent data file is deemed not to have been placed.

If the sender later disputes a signature, a second verification step follows in step 136. Recipient 32 sends the signature allegedly received by him/her to TTP 50 along with the associated date and time indication.

In step 138 TTP 50 itself now applies the first formula 22, using as input parameters the digitized biometric features of the sender and the time and the date at which the signed data file was sent by the sender. The application of first formula 22 results in the correct signature associated with the relevant time and date of sending for the relevant sender. TTP 50 now compares the correct signature to the signature of the sent data file, with the possible outcomes that both signatures do or, conversely, do not correspond.

Other components of the system according to the invention, such as the second formula, can also be stored with the TTP. If the numerical value or the numerical value derived therefrom is disputed (see DNV below), a check can be carried out in the same manner as described for the first formula.

In step 140 TTP 50 sends the outcome of the comparison of step 138 to the recipient and the sender. If the two signatures do correspond, it will be very difficult for the sender to legally contest the authenticity of the sent data file and the signature thereof successfully. If the two signatures do not correspond, there is a reasonable likelihood that the signature of the sent document will be deemed false, i.e. invalid.

Danger of Simultaneity

In a purely technical sense the present invention also comprises the electronic signature comprising a selected series of for instance 50 types of spider or 50 types of French cheese. In order to create a guarantee that the danger of simultaneity will not occur, the invention operates only with biometric features.

The danger of simultaneity means that a sender A signs and sends three mutually differing statements on three different computers at practically the same time. In each statement the sender here identifies him/herself in a different way, for instance once with spiders, a second time with French cheeses and a third time with biometric features.

In order to prevent the danger of simultaneity, the signature according to the present invention comprises only biometric features. The biometric features are expressed in general terms and partly for this reason allow storage using generally accepted standardizations. The stored biometric features can hereby be consulted in retrospect. It is hereby possible to check whether the storage has not already taken place before. The TTP can thus check whether the input of the first formula and the associated biometric features has not already taken place before.

The Role of a Third Party

The signature generated by the first formula forms a coupling of a selected series of biometric features to a time interval. Owing to the coupling a third party does not have to play an active role in the realization of the signature. This is because the signature can be the result of programmed computer equipment which determines which selected series is associated with which time interval and point in time.

The third party can first of all provide the equipment. The third party can here for instance program this equipment. A copy of the equipment, or only of the first formula, can be held by the third party for the purpose of later verification of a signature and files signed therewith.

Examples of First Formula

Various biometric features of the sender are stored, for instance 10 fingerprints. In order to increase the number of possibilities the processing unit can divide the stored biometric features into parts. The parts, for instance 50 subdivisions, can also be used in the signature. The number of biometric features comprises for instance the 10 fingertips and/or the 50 subdivisions thereof.

The processing unit can for instance form a series comprising a random sequence, differently randomized per individual sender, of the stored number of, for instance 50, biometric features.

An extended series is formed by forming such a random series a number of times, for instance 1000 to 3000 times, and then arranging the series successively. The extended series comprises for instance between 50,000 and 150,000 successively placed biometric features. The successively placed, randomly selected series then consists of series which are all different and chosen at random.

The extended series X is for instance:

$$X=\{x0, x1, x2, x3, \ldots, xN\},$$

wherein N is in this example 150,000.

The signature is for instance a selection from the extended series. The selection for instance follows a determined, variable pattern. This pattern is for instance {14x4/3/2, 14x4/2/3, 14x2/3/4, 14x2/4/3, 14x3/2/4, 14x3/4/2}. This means that signature Y at time interval ti_k is:

$$Y(ti\_1)=\{x0, x1, x2, x3\}$$

$$Y(ti\_2)=\{x4, x5, x6\}$$

$$Y(ti\_3)=\{x7, x8\}$$

$$Y(ti\_4)=\{x9, x10, x11, x12\}$$

$$Y(ti\_5)=\{x13, x14, x15\}$$

etc.

In an embodiment the first series is used a number of times, for instance 6×14=84 times. The series is used first from starting point x0 to end point x50, and back. The series is then used from starting point x1 to end point x0, and back. The shifting of a single position is repeated until x0 would once again be the starting point, after which the subsequent series is started.

In another embodiment the above is repeated at xN when the end of the extended series is reached. The repetition takes place from for instance position x2, and a following time from x5, etc.

With the above stated exemplary technique 210 million different signatures can for instance be generated. At a time interval in the order of 10 seconds it will take in the order of 67.5 years before all possible signatures have been generated.

Figure 3:
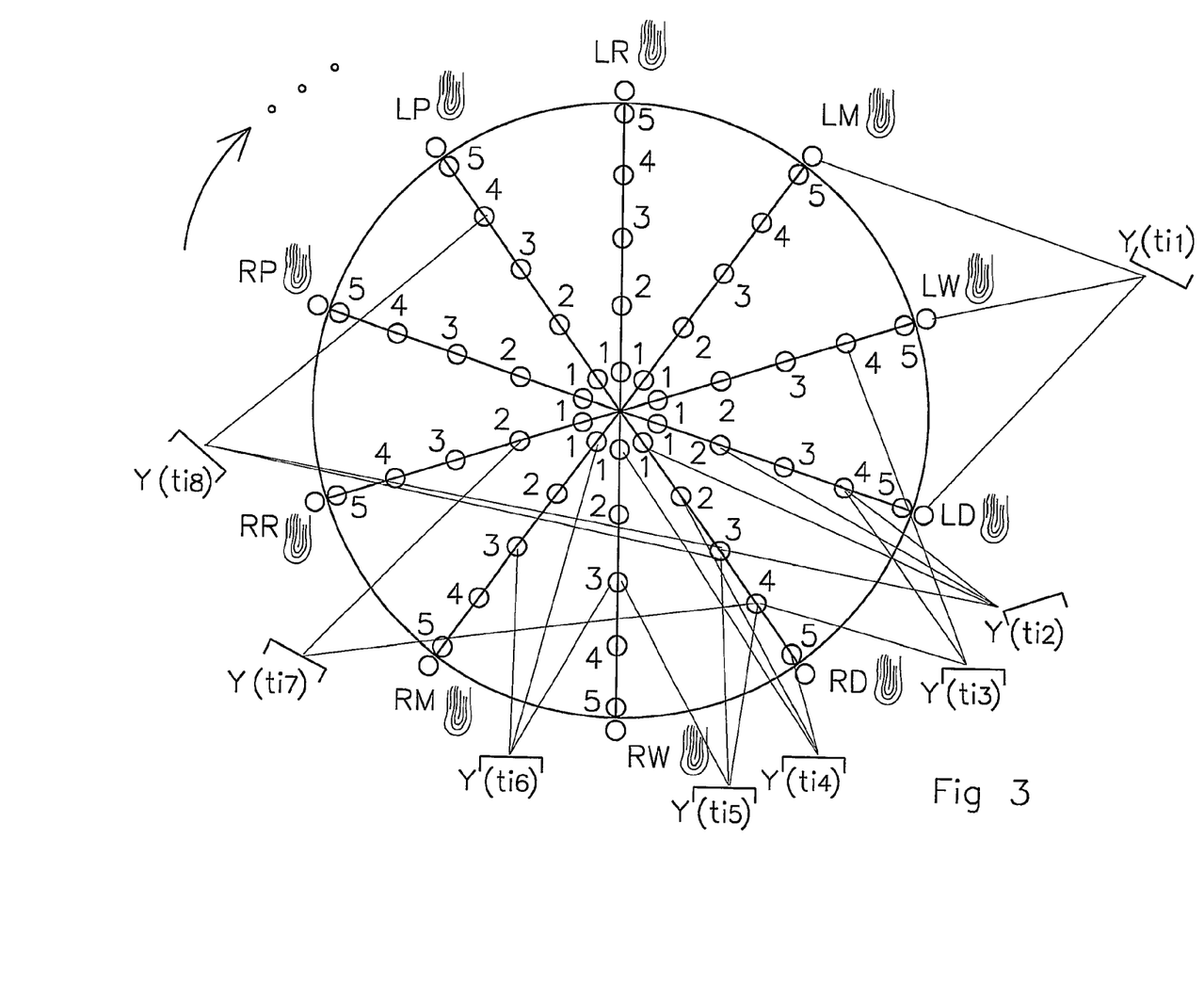
FIG. 3 shows a schematic example of the operation of the first formula.

FIG. 3 shows a schematic representation of another example of the signature. Shown are signatures Y(ti_k) at time intervals k={1, 2, 3, ...}. Shown in the circle is a number of stored biometric features. The number of biometric features comprises fingerprints {RD, RW, RM, ..., RD} divided into five parts {1, 2, ..., 5}. The codes represent right thumb RD, right index finger RW, and so on.

The signature takes a different number and/or makes a different choice per time interval from the number of biometric features.

Example of Second Formula

The file F for signing is for instance:

$$F=\{\text{After careful consideration} \ldots\}$$

A numerical value NV comprises for instance a mathematical calculation of the number of different symbols in file F, i.e. of the number of a's (sum_a), the number of b's (sum_b), and so on. The numerical value NV is for instance:

$$NV=(\text{sum\_}a)\times(\text{sum\_}b):(\text{sum\_}?)\times(\text{root}(\text{sum\_}g))\times((\text{sum\_}7)/3)$$

If the numerical value NV is determined in this way, a derived numerical value DNV can then be defined as a first number of digits of the numerical value. If for instance NV=123456,789, then DNV=123. As a formula:

$$DNV=(\text{first three digits of NV})$$

The second formula ensures that the first formula for instance generates a signature Y(ti_k, DNV) which is a function of time interval ti_k and of the DNV:

$$Y(ti\_k, DNV)=Y(ti\_(k-DNV))$$

Y(ti_(k-DNV)) is a signature generated by the first formula and coupled to time interval (k-DNV). A coupling of the signature and the data file thus results from the combination of the signature Y(ti_k) generated by the first formula, the derived numerical value DNV and the signature Y(ti_(k-DNV)) generated by the first formula and the second formula.

The coupling can be verified by the third party TTP. The coupling enables an objective check by the TTP of the combination of signature(s) and the sent file.

Example of Application in Deed Under Private Writing with Both Parties Signing as According to the Present Invention Both sender S and recipient R make use of the system according to the present invention. This relates to a deed under private writing.

S possesses a first device as described above in which biometric features of S are stored. R possesses another first device in which biometric features of R are stored.

Step 1

The file for electronic signature is provided by the equipment with an NV at S. The NV is made available to S.

S sends a signature Y(S, ti_1) together with the NV to R at time ti_1.

Upon receipt, R sends Y(R, ti_2) to R at time ti_2.

On the basis of the data Y(S, ti_1), Y(R, ti_2) and NV, a third signature is prepared at S and R. The third signature is a function of the signature of the sender, the signature of the recipient and of the NV. The third signature is for instance generated at both S and R, and is the same for both. If desired, the third signature operates as an access code for the first device. The communication between S and R can be protected from others by the third signature.

The third signature as access code could also take place without file and without NV, i.e. on the basis of the exchange of only Y(S, ti_1) and Y(R, ti_2).

Step 2

S sends the file again, together with a signature Y(S, ti_3) associated with time interval ti_3. S requests from R confirmation of the NV.

R sends the confirmation together with signature Y(R, ti_4) at time interval ti_4.

Step 3

Receipt of the confirmed NV deactivates the part of the first device at S which prepares the signatures.

S must once again enter an address of R. S then reactivates the first device by identification with a biometric feature. The biometric feature is for instance an iris scan or touching the screen using one or more fingers.

Step 4

The reactivation generates the DNV of the sender, DNV (S), at S. The DNV is sent immediately to R at time t5. The DNV(S) is sent together with the reconfirmation of the NV. If desired, S can then provide the file with an access code consisting of another electronic signature according to the present invention related to the point in time or time interval of preparation.

Step 5

Receipt of the reconfirmed NV deactivates the part of the first device at R which prepares the signatures according to the present invention.

R must once again enter an address of S. R should then reactivate the first device by means of an identification with a biometric feature.

Step 6

The activation generates the DNV of the recipient, DNV (R), at R. The DNV(R) is sent immediately to S at time t6.

If desired, R can provide the file with an access code consisting of yet another signature according to the present invention.

DNV(S) and DNV(R) are preferably a function of Y(S, ti_1) and Y(R, ti_2), and are therefore preferably the same.

Step 6a (optional)

It is possible to opt for deactivation of the access code once DNV(R) has been sent or received.

Result

Y(S, ti_1), Y(R, ti_2)VS1, Y(S, ti_3), Y(R, ti_4), DNV (S), DNV(R) and NV can be verified at the TTP.

S can thus be certain that no-one but R him/herself has (again) signed a file with a determined content during time interval ti_2 or ti_4.

R can be certain that no-one but S him/herself has signed a file with a determined content during time interval ti_1 or ti_3.

The NV and the DNV make it impossible here for R or S to change the signed file without this being noticed.

Example of Application in Officially Certified Notarial Deed

This relates to an officially certified (notarial) deed with mutual signature according to the invention of sender S and recipient R.

Step 1

The data file for electronic signature is provided with an NV at sender S. The NV becomes available to sender S as datum for sending.

S sends signature Y(S, ti_1) together with the NV to recipient R and to the notary at time t1.

Recipient R replies to sender S and to the notary with Y(R, ti_2).

On the basis of Y(S, ti_1), NV and Y(R, ti_2) the same transaction access code is prepared at sender S and recipient R, whereby the communication between S and R can be protected from others.

The preparation of a transaction access code could optionally also take place on the basis of the exchange of only Y(S, ti_1) and Y(R, ti_2).

Step 2

Sender S sends the data file once again to recipient R. This time the data file is signed with the signature Y(S, ti_3) associated with time interval ti_3.

Sender S requests confirmation of the NV from recipient R.

Recipient R provides sender S with a confirmation in an e-mail signed with Y(R, ti_4). Recipient R sends the NV to the notary and recipient R requests reconfirmation of the NV from sender S.

Step 3

Receipt of the confirmed NV deactivates the part of the equipment at sender S which prepares the electronic signatures. Sender S must again enter the address of recipient R. The equipment involved in preparing the electronic signature must then be reactivated. Activation takes place by identification with one or more biometric features.

Step 4

Reactivation generates the DNV at sender S. The DNV is sent immediately, at time t5, to recipient R and to the notary together with the reconfirmation of the NV.

If desired, sender S can then provide the data file with an access code consisting of a different electronic signature according to the invention, which is of course related to the time interval of preparation.

Step 5

Receipt of the reconfirmed NV deactivates the part of the equipment at R which prepares the electronic signatures according to the present invention.

Recipient R must once again enter the e-mail address of sender S and then reactivate the equipment involved in preparing the electronic signature by means of identification.

Step 6

Reactivation generates the DNV(R) at recipient R. The DNV(R) is sent immediately to sender S and to the notary at time t6.

If desired, recipient R can then provide the data file with an access code consisting of a different electronic signature according to the present invention related to the time interval of preparation.

It can optionally be decided to deactivate the transaction access code after DNV(R) has been sent or received.

Step 7

The notary then verifies at the TTP the Y(S, ti_1), DNV (S), Y(R, ti_2), DNV(R) and the NV received by the notary.

After receiving the DNV(S) and the DNV(R) the notary can make a declaration with legal force signed by him/her with an electronic signature according to the present invention. According to the declaration of the notary, sender S and recipient R have signed a file with a content which has been made known to him/her, the notary. The content corresponds with the identical NVs received by the notary.

Result

When he/she receives them, the notary can be certain that the DNV(S) and the DNV(R) cannot have been placed by a fraudulent person. The notary can herein carry out a double check at the TTP, that on the one hand the Y(S, ti_1), the NV and the DNV mutually correspond, and that on the other the Y(R, ti_2), the NV and the DNV(R) mutually correspond.

There can thus no longer be any justifiable doubt that S and R have indeed made and signed the statement in the file. The notary can hereby sign a declaration with legal force in which the statement of S and R in the file is confirmed.

Example of Application in Private Deed, Wherein Only the Sender can Sign According to the Present Invention Step 1

The data file for electronic signature is provided with an NV at sender S. The NV becomes available to S as an access code. The data file is provided with this access code by sender S. A signature Y(S, ti_1), which is not protected by an access code, is added thereto. This is all sent to R.

Step 2

Recipient R returns all at time t2. The data file is herein not opened by R. Optionally only the data file is returned, without the Y(S, ti_1).

Step 3

Receipt of the identical numerical value NV in the returned data file deactivates the part of the equipment at sender S which prepares the electronic signatures.

Sender S must once again enter the address of recipient R and then reactivate the equipment by means of identification with biometric features.

Step 4

Reactivation generates the DNV(S) at S. The DNV(S) is sent immediately to recipient R at time t3. The access code, therefore the NV, is also sent to R. Both the sender S and the recipient R can now view the data file signed once again by S at t3. Both S and R have at their disposal the Y(S, ti_1), the DNV(S) and the NV.

Result

The Y(S, ti_1), the DNV and the NV can, partly in relation to each other, be verified at the TTP. Recipient R can thus be certain that no-one other than sender S him/herself signed a file with a determined content (again) at time t3. S has the certainty here that R has not changed the data file signed by him/her, S, at time t1.

Example of Application in Notarial Deed

The same step-by-step plan is followed as above, with the addition that all e-mails exchanged between sender S and recipient R must also be sent to the notary.

At time t3 the notary notes receipt of the DNV. The notary verifies at the TTP that the combination of first signature (of the sender), the derived numerical value DNV and the numerical value NV confirmed by R is correct.

The notary can then send a declaration. The declaration is signed by him/her with an electronic signature according to the present invention. The declaration relates to the fact that at time t3 sender S (once again) signed his/her statement for inclusion in the notarial record.

The above described embodiments serve only by way of example. Many variations are possible within the scope of the appended claims. Features of different embodiments can be combined.

What is claimed is:

1. A method for generating a signature for a data file to be sent to a recipient by a sender, comprising:
providing a plurality of digitized biometric features;
determining a first sending time;
determining a first time interval within which the first sending time falls; and
generating a first signature, wherein said first signature consists of a plurality of positions, wherein each position of said first signature is filled with one of the digitized biometric features selected from among the plurality of digitized biometric features, wherein the selection is determined using a sending formula, wherein said selection of digitized biometric features differs per each determined time interval.

2. A method as claimed in claim 1, wherein the plurality of digitized biometric features comprises different parts of digitized biometric features.

3. A method as claimed in claim 1, wherein the first time interval is less than or equal to 30 seconds.

4. A method as claimed in claim 1, wherein the plurality of digitized biometric features comprises at least ten different biometric features.

5. A method as claimed in claim 1, wherein the number of positions comprises at least five positions.

6. A method as claimed in claim 1, wherein the number of said plurality of positions differs per determined time interval.

7. A method as claimed in claim 1, further comprising replacing the sending formula per period.

8. A method as claimed in claim 7, wherein the period is about 0.5 to 5 years.

9. A method as claimed in claim 1, further comprising: determining a second sending time; determining a second time interval within which the second sending time falls; generating a second signature, wherein said second signature consists of a plurality of positions, wherein the plurality of digitized biometric features are digitized biometric features of the recipient, wherein each position of said second signature is filled with one of the digitized biometric features selected from among the plurality of digitized biometric features of the recipient, wherein the selection is determined using a second sending formula, wherein said selection of digitized biometric features differs per each determined time interval; and the recipient sending the second signature to the sender.

10. A method as claimed in claim 9, further comprising: generating a third signature which is a function of the first signature and of the second signature.

11. A method as claimed in claim 10, further comprising: determining a numerical value of the data file; and generating a fourth signature on the basis of a fourth time interval using the sending formula, wherein said fourth time interval is a function of the first time interval and of the numerical value.

12. A method as claimed in claim 11, wherein for the purpose of generating the fourth signature a derived numerical value (DNV) derived from the numerical value is subtracted from the first time interval.

13. A method as claimed in claim 1, further comprising: i) forming a series comprising arranging the plurality of digitized biometric features in a random sequence; ii) repeating step i) a number of times to form a plurality of series; and iii) arranging the plurality of series successively for the purpose of forming an extended series of biometric features.

14. A method as claimed in claim 13, wherein the sending formula generates the first signature by selecting digitized biometric features for each signature position from among the extended series of biometric features wherein said selection of digitized biometric features differs per each determined time interval.

15. A method as claimed in claim 14, wherein a trusted third party (TTP) holds a copy of the sending formula.

16. A method as claimed in claim 15, further comprising: the sender disputing a signature of a sent data file; the recipient sending the signature to the trusted third party for the purpose of verification; the trusted third party applying the sending formula for the purpose of generating a check signature using the sending formula on the basis of the time interval of sending of the data file and the plurality of digitized biometric features of the sender; and comparing the check signature with the first signature of the sent data file.

17. A system for generating a signature for a data file to be sent to a recipient by a sender, comprising: a first device, comprising: a first memory; time-determining means for determining a first sending time and a first time interval within which the first sending time falls; and a processing unit coupled to the first memory and to the time-determining means; a sending formula stored in the first memory; and a plurality of digitized biometric features stored in the first memory; wherein the first device is adapted to provide the data file to be sent with a first signature which is generated by the sending formula; wherein said first signature consists of a plurality of positions, wherein each position of said first signature is filled with one of the digitized biometric features selected from among the plurality of digitized biometric features, wherein the selection is determined using the sending formula, wherein said selection of digitized biometric features differs per each determined time interval.

18. A system as claimed in claim 17, wherein the plurality of digitized biometric features comprises different parts of digitized biometric features.

19. A system as claimed in claim 17, wherein the first time interval is less than or equal to 30 seconds.

20. A system as claimed in claim 17, wherein the plurality of digitized biometric features comprises at least ten different biometric features.

21. A system as claimed in claim 17, wherein the number of positions comprises at least five positions.

22. A system as claimed in claim 17, comprising another first device for generating a second signature therewith by the recipient after receipt of a data file provided with the signature.

23. A system as claimed in claim 22, wherein the first device and the other first device are adapted to generate a third signature which is a function of the first signature and of the second signature.

24. A system as claimed in claim 17, wherein the first device comprises security means for allowing the sender to operate the first device only after identification based on one or more of sender's biometric features.

25. A system as claimed in claim 17, also comprising a third memory which is held by a third party, such as a trusted third party (TTP) or a government agency, wherein the sending formula is stored in the third memory.

* * * * *